United States Patent [19]

Ludlow

[11] 3,981,467
[45] Sept. 21, 1976

[54] LAUNCH LOCK DEVICE

[75] Inventor: Kenneth G. Ludlow, Manhattan Beach, Calif.

[73] Assignee: The United States of America as represented by the Secretary of the Air Force, Washington, D.C.

[22] Filed: Oct. 17, 1975

[21] Appl. No.: 623,530

[52] U.S. Cl. ............................ 244/158; 85/5 CP; 151/5; 292/33; 403/319
[51] Int. Cl.² .................................. B64G 1/00
[58] Field of Search .......... 244/159, 158, 161, 164, 244/165, 170, 131, 1 R; 151/5, 39; 85/1, 5 CP, 5 M; 292/DIG. 72, 141.33, 302; 403/315–319

[56] References Cited
UNITED STATES PATENTS

| | | | |
|---|---|---|---|
| 2,043,598 | 6/1936 | Sybia | 403/319 |
| 2,489,984 | 11/1949 | Shoemaker | 244/161 |
| 3,119,298 | 1/1964 | Brown | 85/1 |
| 3,540,509 | 11/1970 | Gutshall | 151/39 |
| 3,638,983 | 2/1972 | Flournoy et al. | 292/144 |
| 3,731,963 | 5/1973 | Pond | 292/144 |
| 3,767,139 | 10/1973 | Fischell | 244/165 |

*Primary Examiner*—Stephen G. Kunin
*Assistant Examiner*—Galen L. Barefoot
*Attorney, Agent, or Firm*—Joseph E. Rusz; Arsen Tashjian

[57] ABSTRACT

A structural lock for locking in each of three axes, during the launch phase, the rotatable structural portion of a spacecraft and a despun structural shelf commonly used in dual spin spacecraft. A single sliding pin which connects the two sections, is withdrawn by a pyrotechnic device prior to achieving orbit. The pin engages an adjustable spring biased, two piece member which includes serrated mating surfaces for providing a positive shear path in the Z direction.

3 Claims, 3 Drawing Figures

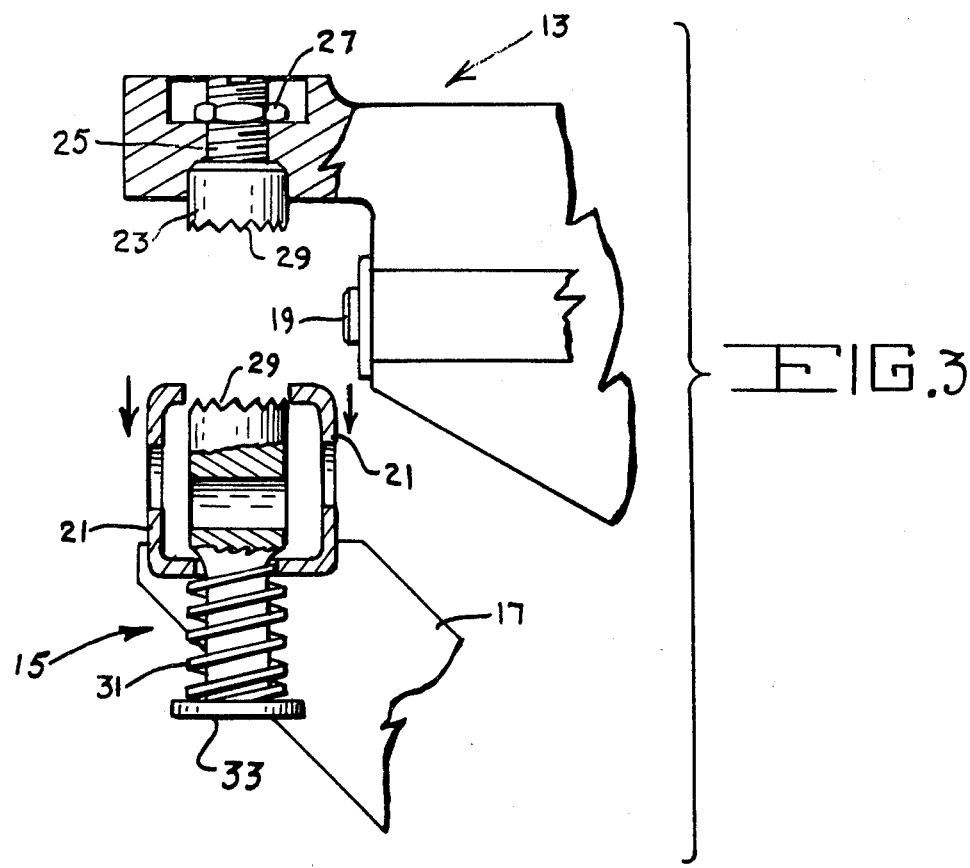

LAUNCH LOCK DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to a three axes structural lock and, more particularly, the invention is concerned with providing a lock device for maintaining the rotatable and despun portions of a spacecraft in position during launch and permitting separation after launch by causing a single sliding pin to be retracted.

Heretofore, the common practice in designing locking device for structually connecting the spun and despun sections of a dual spin spacecraft included a device having locking capability in two directions only. This type structural locking device is required for connecting, during the launch phase, the rotatable structural portion of the spacecraft and the despun structural shelf commonly used in the dual spin spacecraft. In order for the connection of the two spacecraft elements to remain locked during the launch phase, it is necessary to react the transverse loads, axial loads and rotational loads. Normally, this would require at least two separate locking devices since only two of the loads can be restrained with each locking device and many times three separate devices are installed, one for each of the loads. It can be seen that the plurality of locking devices does create a greater possibility of malfunction and failure of operation with the resulting chance of failure of the entire space mission.

The present invention provides an improved locking arrangement which reduces the possibility of failure by using a single pyrotechnic pin puller to activate the unlocking mechanism. The single pin and associated hardware, by utilizing the inherent structural capability of the despun platform, react: (a) transverse loads, (b) axial loads and (c) rotational loads.

SUMMARY OF THE INVENTION

The present invention provides an improved launch lock device for use on a spacecraft spin structure and platform or the like and is characterized by the use of a single pyrotechnically activated pin which operates to maintain the despun platform to the spacecraft during the launch phase. The pin reacts longitudinal X and transverse Y loads. To provide a positive shear path in the Z direction, a serrated fitting is attached to the despun platform thereby providing positive face-to-face contact to structurally connect the platform and spun structure by means of this fitting.

Accordingly, it is an object of the invention to provide an improved launch lock device having a structural lock in each of three axes and using a single pyrotechnic pin puller as the unlocking mechanism.

Another object of the invention is to provide a structural locking device which is suitable for connecting, during the launch phase, the rotatable structural portion of a spacecraft and a despun structural shelf as used in dual spin spacecraft.

Still another object of this invention is to provide a launch lock mechanism that utilizes a single pyrotechnically retractable lock pin device and associated hardware to effectively react the transverse, axial and rotational loads on a dual spin spacecraft during the launch phase.

A further object of the invention is to provide a locking device having locking capability in three directions and capable of being unlocked to allow free rotation between a spacecraft spin structure and platform after peak loadings during launch.

A still further object of the invention is to provide a launch lock device wherein the despun and spun sections of a dual spin spacecraft are structurally connected by a sliding pin which is withdrawn by a pyrotechnic device prior to achieving orbit. A serrated fitting is attached between the sections to provide a positive shear path in the Z direction.

These and other objects, features and advantages will become more apparent after considering the following description taken in conjunction with the annexed drawings and appended claims.

BREIF DESCRIPTION OF THE DRAWINGS

FIG. 3 is a side view in partial section of a launch lock device after withdrawal of the pin and separation of the despun and spun sections to allow for rotation between the two elements.

DESCRIPTION OF A PREFERRED EMBODIMENT

Figure 1:
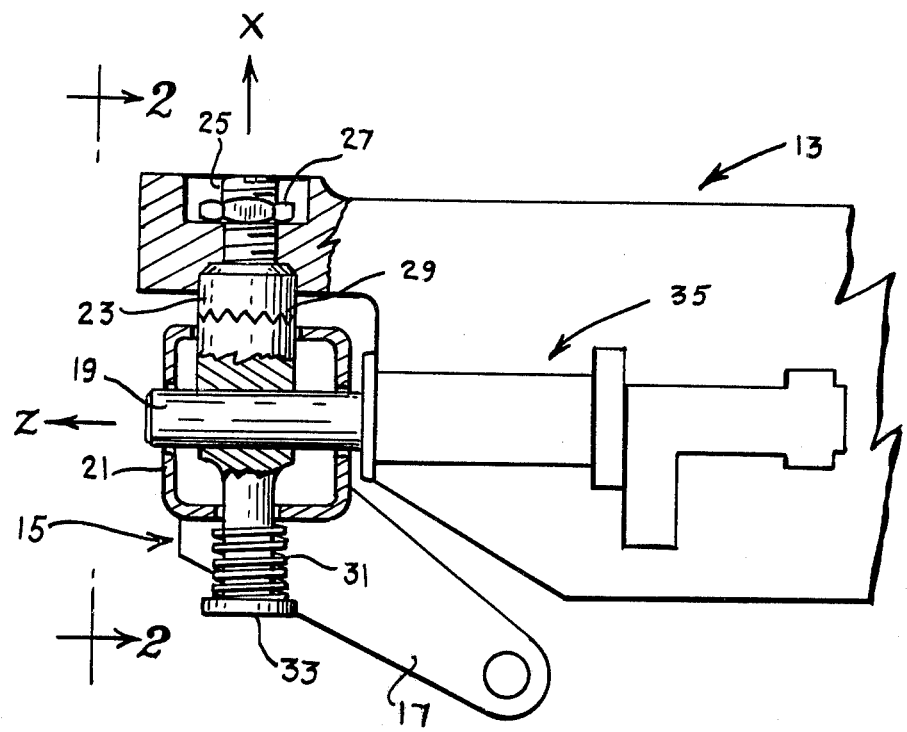
FIG. 1 is a side view in partial section of a typical despun and spun arrangement of the dual spin spacecraft showing the three axes structural lock according to the invention.
Figure 2:
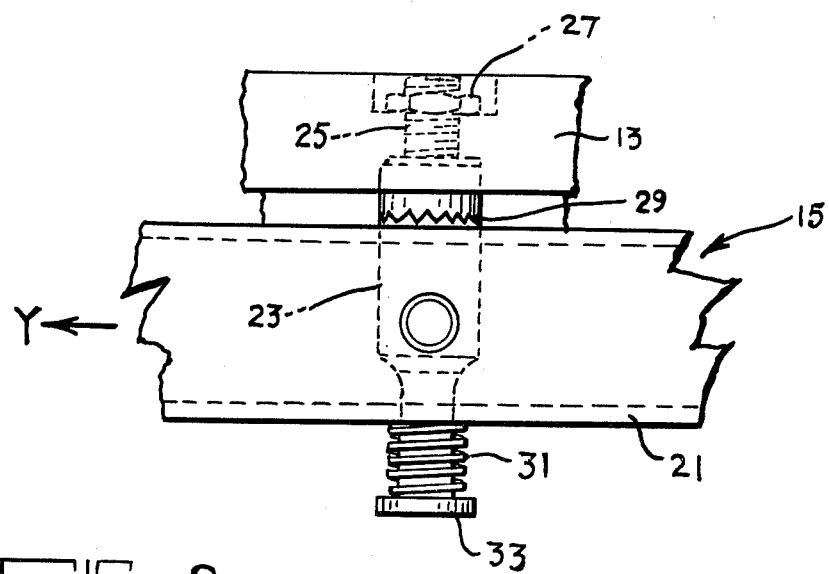
FIG. 2 is a side view of the launch lock device according to the invention as shown in FIG. 1 and viewed in the direction 2—2.

Referring now to the drawings, in FIG. 1 there is shown a partial view of a typical despun section 13 and a spun section 15 which comprise a dual spin spacecraft. The despun section 13 would normally include a structural platform and the spun section 15 would include the spacecraft rotatable structure having the truss member 17 attached thereto. The two sections 13 and 15 are structurally connected by the use of the sliding pin 19 which passes through a tubular channel element 21 which is part of the spacecraft rotatable structure 15 and through an upright member 23 which is attached to the despun structural platform 13 by means of the threaded portion 25 with the nut 27 engaged therewith. The upright member 23 includes serrated mating surfaces 29 near the upper end thereof and includes a biasing spring 31 positioned between the head 33 and the channel element 21 operating to urge the member 23 downward.

A pyrotechnic pin puller 35 shown schematically in FIG. 1 operates to retract the pin 19 after the peak loadings during launch thereby unlocking the spacecraft spin structure 15 from the platform 13 to allow free rotation between the elements. The withdrawal of the pin 19 allows the movable serrated fitting 29 to be separated by the spring 31 which provides clearance between the upper and lower sections of the member 23 and permits the independent rotary movement without interference. Ordinarily, three or more of the above-described lock devices would be required in order to provide the necessary structural connection between the spun section 15 and the despun structural platform 13. Thus, disconnection of the structural tie in all three axes is accomplished by retracting the sliding pin 19.

MODE OF OPERATION

The launch lock device hereinbefore described operates in the following manner when used to lock the spun and despun sections of a spacecraft together during the launch phase. As best shown in FIG. 1, the two sections 13 and 15 are structurally connected by the sliding pin 19 which extends from the despun section 13 through the tubular channel element 21 and upright member 23. This arrangement serves to react the longitudinal X and transverse Y loads acting on the sections 13 and 15. To provide a positive shear path in the Z direction, a serrated fitting 29 is added to the upright member 23 as shown in the attached Figures. An adjustment means including a threaded body portion 25 and a nut 27 serves to provide positive face-to-face contact at the serrated mating surfaces of the upright member 23 thus structurally connecting the platform 13 and the spun structure 15. The serrated fitting 29 is retained in position by the sliding pin 19.

Disconnection of the structural tie in all three axes (X, Y, and Z) is permitted by retracting the sliding pin 19 which is accomplished by activating the pyrotechnic device 35 in any suitable manner, preferably, by remote control. This withdrawal of the pin 19 allows the upright member 23 to separate at the serrated fitting 29 in response to the force of the biasing spring 31 which causes the lower portion of the member 23 to drop down thereby providing clearance between the two portions thereof as shown in FIG. 3. The separation of the member 23 at the serrated fitting 29 along with the prior withdrawal of the pin 19 effectively permits independent rotary movement of the spun section 15 without interference with or from the despun platform section 13. This feature is particularly important where it is desirable to retain the dual spacecraft spun and despun sections in locked condition during launch and unlocking them at a predetermined flight position prior to achieving orbit.

Thus it can be seen, that although the hereinbefore described improved launch lock device is designed primarily for use on a dual spin spacecraft, it can be employed in other structural arrangements where it is necessary and desirable to release two sections of a structure by the use of a single remotely activated pyrotechnic sliding pin. The unlocking mechanism operates to release the structural lock in each of the three axes. Previously known locking devices provided locking capability in two directions only. This latter feature is very important in space flight where it is a necessary requirement that all mechanical functions operate positively without malfunction since the single pin withdrawal provides the full separation capability.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use in other operations where it is desirable to fixedly attach a rotatable object to a stationary platform for subsequent release at a remote point by the withdrawal of a single pyrotechnically activated sliding pin.

Having thus set forth and described the nature of my invention, what I claim and desire to secure by Letters Patent of the United States is:

1. A launch lock device for locking the rotatable structure and the despun structural platform of a dual spin spacecraft in each of three axes during the launch phase, said device comprising a slidable pin disposed for lateral movement into and out of said despun structural platform, a tubular channel element having aligned openings in the sidewall thereof attached to said rotatable structure, said pin being positioned to pass through the aligned openings in said channel element, a two-piece upright member positioned within said channel element and passing through the upper and lower walls thereof, said upright member having an opening therethrough in alignment with the openings in the sidewall of said channel element, said pin passing through the opening in said upright member, means for preventing lateral movement of said rotatable structure relative to said despun structural platform during the launch phase of said spacecraft, and means for releasing said rotatable structure from said despun platform after a predetermined flight distance prior to orbit of said spacecraft thereby allowing free rotation of said rotatable structure.

2. The launch lock device defined in claim 1 wherein the means for preventing lateral movement of said rotatable structure relative to said despun structural platform includes serrated mating surfaces on the face of each piece of the two-piece upright member, said mating surfaces being in face-to-face contact with each other during the locked launch phase.

3. The launch lock device defined in claim 2 wherein the means for releasing said rotatable structure from said despun platform includes a pyrotechnically activated pin puller operatively connected to said pin for withdrawing said pin out of the aligned openings in the sidewalls of said channel element and in said upright member, said upright member having a head which extends below channel element and a biasing spring positioned between the lower wall of said channel element and the head of said upright member urging said upright member downward thereby separating said upright member at the serrated mating surfaces to allow free rotation of said rotatable structure.

* * * * *